United States Patent [19]

Spencer

[11] 4,306,586

[45] Dec. 22, 1981

[54] THREE WAY VALVE

[76] Inventor: Larry K. Spencer, 1204 Tappan Cir., Carrollton, Tex. 75006

[21] Appl. No.: 142,763

[22] Filed: May 5, 1980

[51] Int. Cl.³ .............................................. F16K 11/10
[52] U.S. Cl. ................................ 137/556; 137/627.5; 251/14; 251/94
[58] Field of Search ............... 137/627.5, 556; 251/14, 251/94

[56] References Cited

U.S. PATENT DOCUMENTS

| | | | |
|---|---|---|---|
| 2,656,014 | 10/1953 | Fites | 137/627.5 X |
| 2,959,426 | 11/1960 | Augustin | 251/14 X |
| 3,451,423 | 6/1969 | Priese | 137/556 |
| 3,559,688 | 2/1971 | Fischer | 137/627.5 |
| 3,617,097 | 11/1971 | Grabb | 251/14 X |
| 4,103,864 | 8/1978 | Hagendorn | 251/94 X |

*Primary Examiner*—Robert G. Nilson
*Attorney, Agent, or Firm*—Gerald G. Crutsinger; John F. Booth; Monty L. Ross

[57] ABSTRACT

A three way relay valve has a body defining a bore and first and second chambers, a supply port in fluid communication with the first chamber, and valve and exhaust ports in fluid communication with the second chamber. A plunger is moveably disposed within the bore and extends from the third chamber into the second chamber and a passageway being provided in the plunger for placing the valve port in fluid communication within the body to selectively block fluid communication between the first and second chambers or to block fluid flow through the passageway in the plunger and thereby block fluid communication between the valve and exhaust ports. The valve has a manual reset apparatus and a lock-out device to facilitate actuation of the valve after pilot pressure has been lost.

10 Claims, 7 Drawing Figures

THREE WAY VALVE

This invention relates to a three way valve and, more specifically, to a three way pilot operated valve with a position indicator, manual override and automatic service reset.

The pneumatic control systems employed in oil field well head control systems, safety valve systems and various other process control systems often employ a variety of valves to manipulate supply pressure to operate other devices such as motor valves, piston operated gate valves and hydraulic control systems. These control systems frequently use several different pressure amplitudes to comply with restrictive pressure limits of the sensing devices. For instance, a 30 psi system may operate a 50-500 psi device which in turn may operate in a 10,000 psi hydraulic pressure system.

Some examples of three way valves that have been used in these control systems are disclosed in U.S. Pat. Nos. 3,863,672; 3,874,414; 3,943,974; 3,963,050; 4,011,892; 4,026,326; 4,074,688; 4,074,702; 4,094,340; 4,116,215; and 4,145,025. Typically, these valves have a body with a bore extending therethrough and a spool mechanism moveably disposed in the bore to control the fluid communication between the different ports within the valve. A difficulty with this type arrangement, however, is that the seals carried by the spool may be damaged or destroyed as the spool moves past the ports. Further, these prior art valves frequently lack a positive block and bleed function because a mid position exists which permits simultaneous communication between the supply, valve and exhaust ports.

Accordingly, it is an object of the present invention to provide a three way valve that incorporates a plunger and poppet member disposed in a bore of a valve body which provides a positive block and bleed arrangement with no mid position permitting simultaneous communication between supply, valve and exhaust ports.

Further, it is an object of the present invention to provide a three way valve that inhibits the likelihood of damage to sealing rings by preventing passage of the rings over holes or recesses extending into the bore of the valve body.

Further, it is an object of the present invention to provide a three way relay valve using a plunger and poppet member and a mechanism attached to the plunger to indicate when said valve is in its normal operating function or when in the block and bleed function.

Further, it is an object of the present invention to provide a three way relay valve having a plunger, poppet member and a mechanism to manually override the block and bleed function of the valve.

Further it is an object of the present invention to provide a three way relay valve having a plugger, a poppet member and a mechanism for positively locking the valve in the block and bleed function.

In accordance with the invention, a three way relay valve comprises a body defining first, second and third chambers, a supply port in fluid communication with the first chamber, valve and exhaust ports in fluid communication with the second chamber, and a pilot port in fluid communication with the third chamber to provide a pilot pressure therein. A plunger is moveably disposed within the body, extends from the third chamber into the second chamber and has a passageway provided therein for placing the valve port in fluid communication with the exhaust port. Apparatus is moveably disposed within the third chamber for exerting a force along the plunger in response to the pilot pressure. A poppet member is moveably disposed within the first chamber adapted to engage the body and block fluid communication between the first and second chambers and adapted to engage the plunger to prevent fluid flow through the passageway in the plunger and block fluid communication between the valve and exhaust ports. Apparatus is disposed within the body for urging the poppet member into engagement with the plunger such that the poppet member engages the plunger to block fluid communication between the valve and exhaust ports when the force exerted along the plunger prevents the poppet member from engaging the body and such that the poppet member engages the body to block fluid communication between the supply and valve ports when fluid pressure in the first chamber acting on the poppet member overrides the force exerted along the plunger.

Further, in accordance with the invention, a three way relay valve comprises a body having a bore and first, second and third ports, the ports being in fluid communication with the bore. A plunger is moveably disposed in the bore and has a passageway through which fluid may flow to place the second port in fluid communication with the third port. A poppet member is moveably disposed in the body to selectively block fluid communication between the first and second ports by preventing fluid flow through the bore into the body and between the second and third ports by preventing passage of fluid through the passageway in the plunger. Apparatus is disposed in the body to urge the poppet member into engagement with the body and thereby prevent fluid flow through the bore from the first to the second ports. Apparatus is provided to urge the plunger into engagement with the poppet member and thereby prevent fluid flow through the passageway in the plunger such that fluid communication between the first and second ports is blocked when the poppet member engages the body and fluid communication between the second and third ports is blocked when the poppet member engages the plunger.

In the drawings, wherein like reference characters are used throughout to designate like parts;

Figure 1:
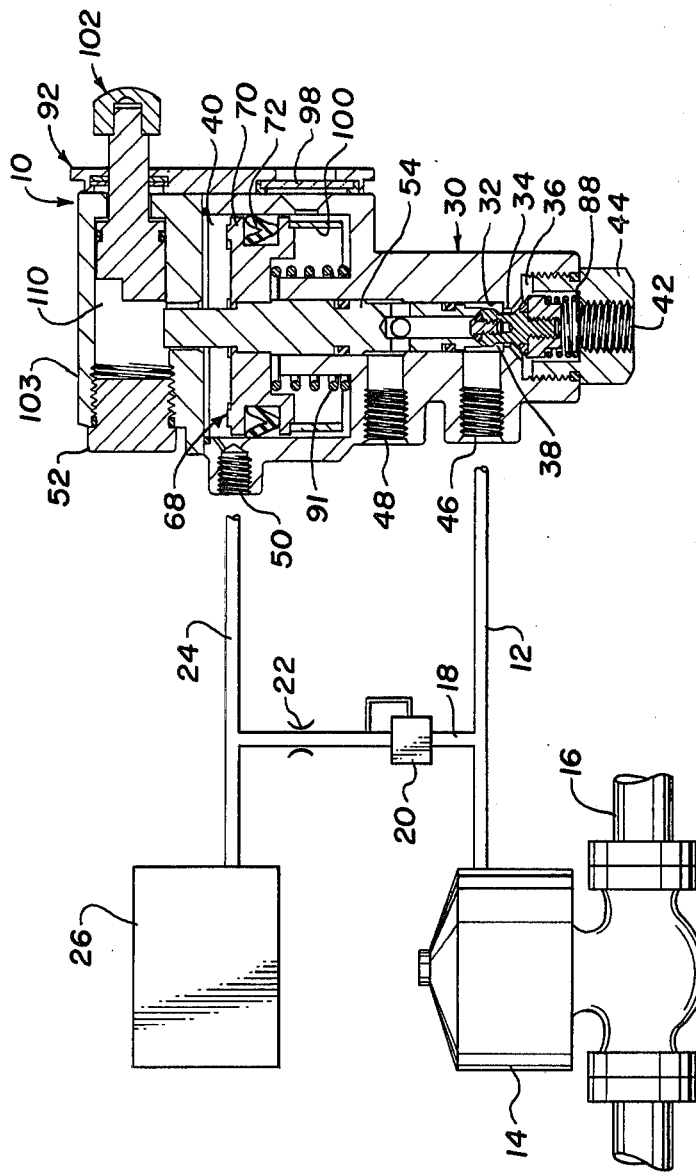
FIG. 1 is a cross sectional, elevation view of a three way relay valve shown in a normal operating function or mode and disposed in a schematically illustrated control system.

Turning now to FIG. 1, there is shown a three way relay valve 10 constructed according to the present invention. Valve 10 is a block and bleed type valve disposed in a fluid control system having a control line 12 extending to a piston operated valve 14 which is regulating fluid flow thru pipeline 16. A pressure line 18 is branched from control line 12 and has a pressure regulator 20 and a orifice 22 to provide a controlled pressure into a pilot line 24. Thus, a fluid having a regulated pressure is provided to pilot control system 26 which in turn for supplies a fluid of chosen pressure to three way relay valve 10.

Figure 2:
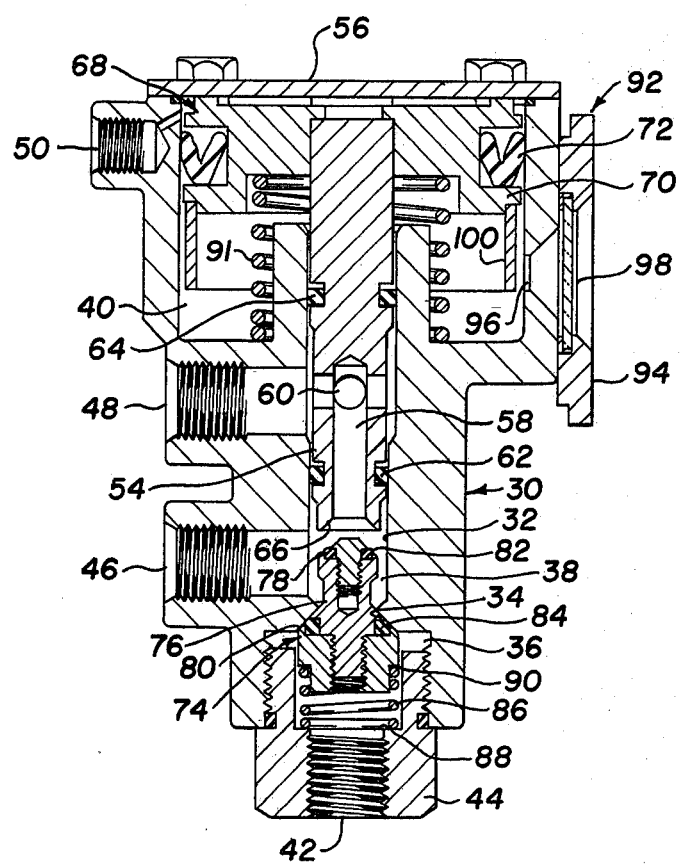
FIG. 2 is a cross sectional, elevation view of another embodiment of the three way valve shown in the block and bleed function or mode.
Figure 3:
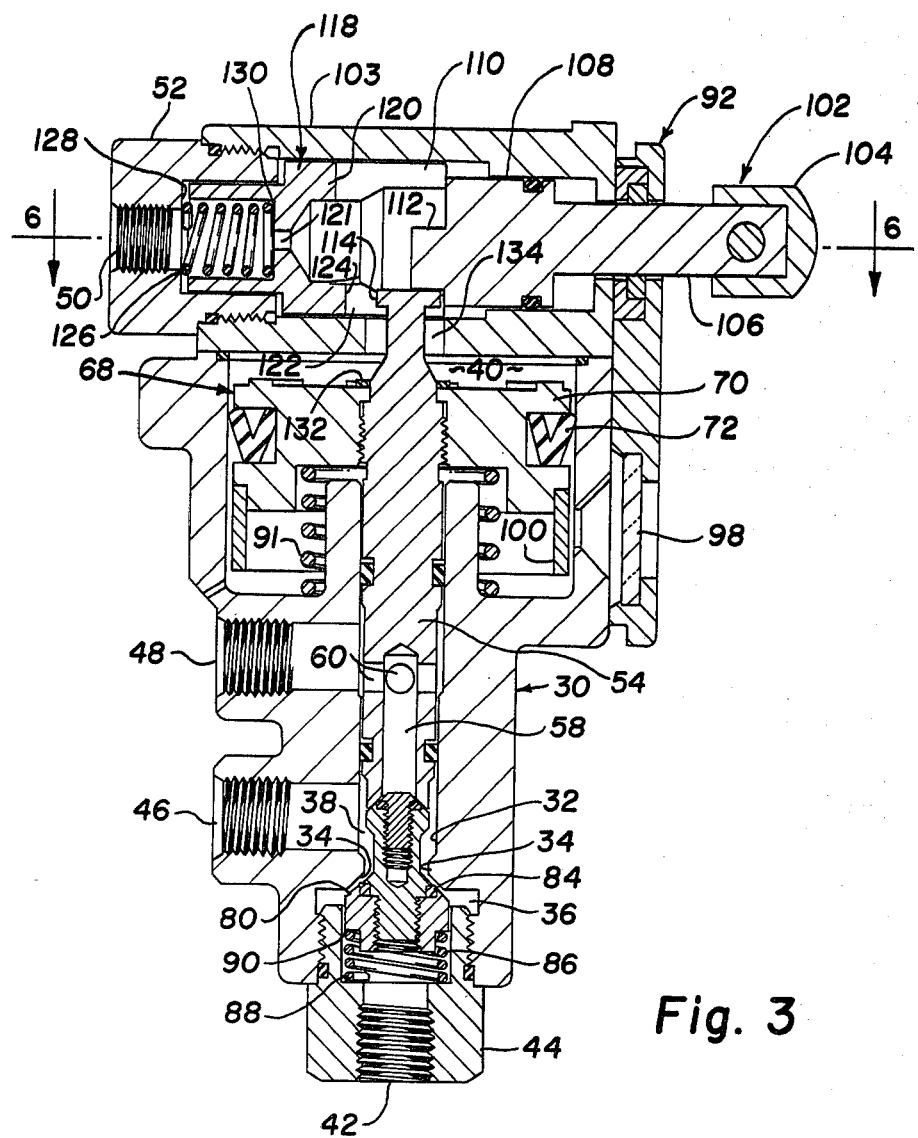
FIG. 3 is a cross sectional, elevation view of another embodiment of the invention shown with manual override and block out apparatus.
Figure 4:
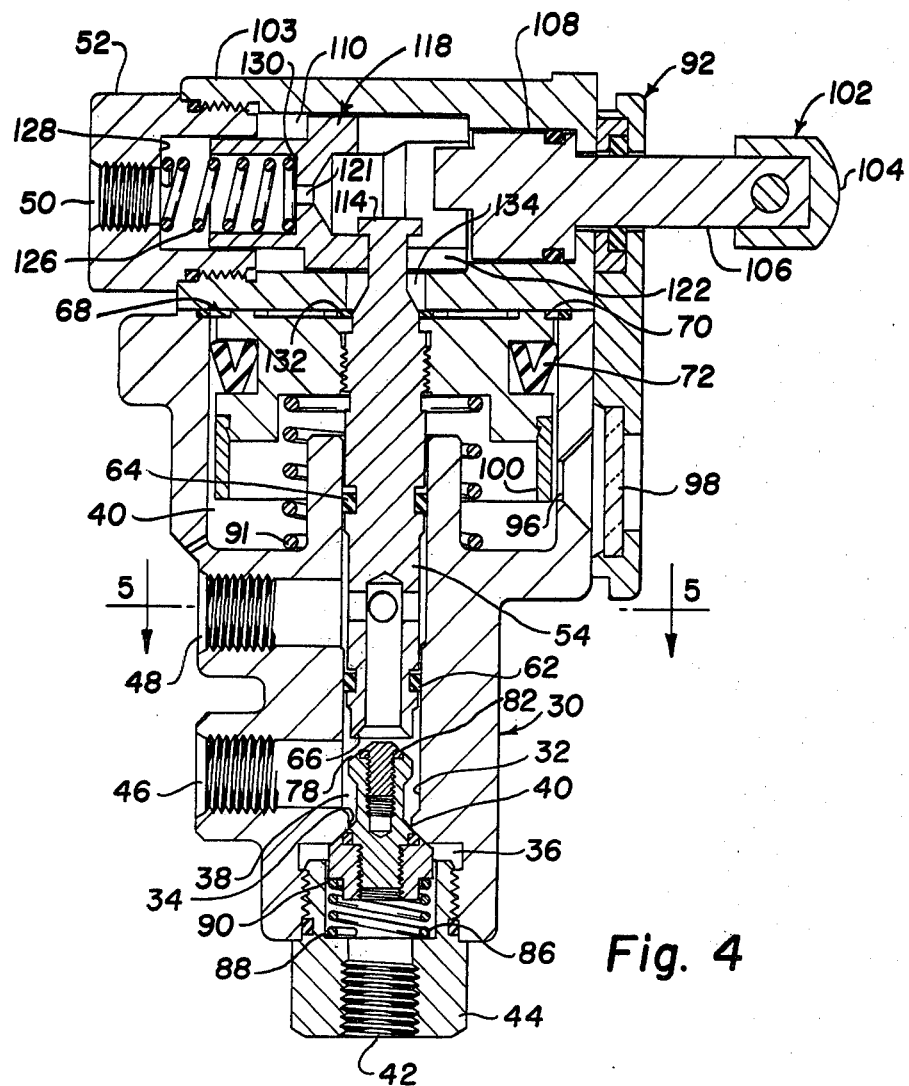
FIG. 4 is a cross sectional, elevation view of the invention shown in FIG. 3 shown in the locked out position.
Figure 5:
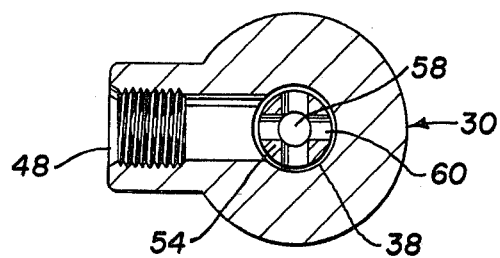
FIG. 5 is a cross sectional view of the invention shown in FIG. 4 taken along lines 5—5 in the direction of the arrows.
Figure 6:
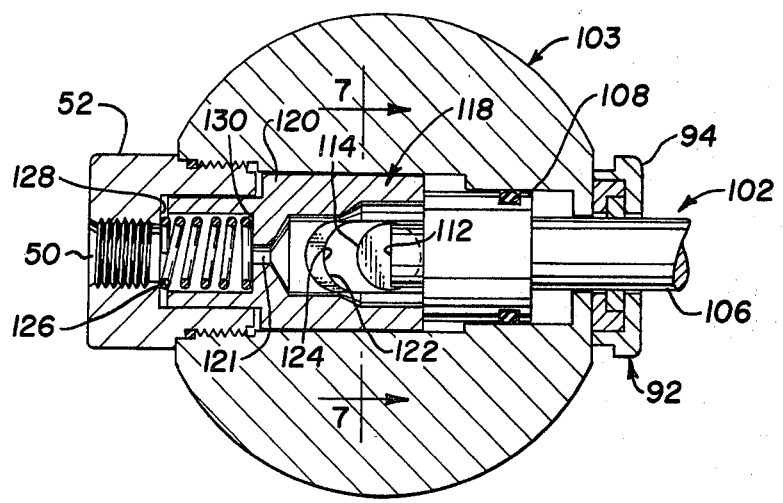
FIG. 6 is a cross sectional view of the invention shown in FIG. 3 along lines 6—6 in the direction of the arrows.
Figure 7:
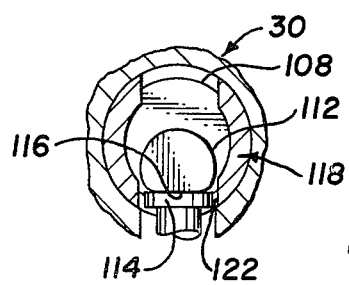
FIG. 7 is a cross sectional view of the invention showing FIG. 6 taken along lines 7—7 in the direction of the arrows.

As shown in the drawings, each embodiment of three way relay valve 10 includes a body 30 with a bore 32 extending through the body. An annular shoulder 34 is provided on body 30 to divide the bore into a first chamber 36 and a second chamber 38. A third chamber 40 is defined in body 30 at the end of the bore opposite from shoulder 34. A first or a fluid supply port 42 is provided in a retainer 44 which is threadedly connected to body 30 with the supply port 42 being in fluid communication with first chamber 36. A second or valve port 46 extends transversely to bore 32 through a side wall of body 30 and is in fluid communication with second chamber 38. In the operation mode, valve 10 receives fluid at supply port 42 and directs it through valve port 46 into control line 12. A third or exhaust port 48 extends generally transverse to bore 32, is in fluid communication with second chamber 38 and is used to exhaust the fluid when valve 10 is in the block and bleed mode. A fourth or pilot fluid port 50 extends through a sidewall of body 30 and is in fluid communication with third chamber 40, as shown in FIGS. 1 and 2, or is provided through a retainer 52, as shown in FIGS. 3 and 4.

A plunger 54 is moveably disposed within body 30 and extends along bore 32 from third chamber 40 into second chamber 38. A passageway 58 extends coaxially with and from the outboard end of plunger 54 to cross ducts 60. Thus, passageway 58 and cross ducts 60 are used to place valve port 46 in fluid communication with exhaust port 48. A sealing ring 62 is disposed within a groove extending annularly around plunger 54 to prevent fluid communication around the plunger between valve port 46 and exhaust port 48. A second sealing ring 64 is disposed within another groove extending annularly around plunger 54 to prevent fluid communication between second chamber 38 and third chamber 40. A shoulder 66 is disposed in the end of plunger 56 to provide a sealing seat.

Apparatus 68 is connected to plunger 56 for exerting a force along the plunger in response to the pressure from pilot fluid received in third chamber 40. Preferably, this apparatus takes the form of a piston 70 connected to the other end of plunger 54 and moveably disposed within the third chamber 40. A sealing ring 72 is disposed around the annular periphery of piston 70 so as to prevent fluid communication around the piston within third chamber 40. Thus, when a pilot fluid of chosen pressure is supplied through fourth port 50, a controlled force is provided along plunger 54 toward first port 42.

A poppet member 74 is moveably disposed within first chamber 36 defined in body 30 to block fluid communication between first chamber 36 and second chamber 38 and to block fluid flow thru passageway 58 in plunger 54 which prevents fluid communication between valve port 46 and exhaust port 48. Poppet member 74 includes a body 76 having a first shoulder 78 extending annularly around body 76 for engaging with shoulder 66 on plunger member 54 and having a second shoulder 80 extending annularly around body 76 for engaging with shoulder 34 on body 30. Also, if desired, a first ring seal 82 may be provided in first shoulder 78 and a second ring seal 84 may be provided in second shoulder 80 to aid in providing sealing engagement between the respective shoulders.

A spring 86 is disposed between a shoulder 88 on retainer 44 and a shoulder 90 on poppet member 74 for urging the poppet member toward engagement with body 30 or toward engagement with plunger 54 so as to block fluid communication between first chamber 36 and second chamber 38 or to prevent fluid flow through passageway 58.

In operation, when a pilot fluid is provided in third chamber 40, the fluid pressure acting on the top of piston member 70 will create a force through plunger 54 against first shoulder 78 on poppet member 74 which permits fluid communication between first chamber 36 and second chamber 38 while blocking fluid flow through passage 58 to thereby prevent fluid communication between second or valve port 46 and third or exhaust port 48. Thus, supply fluid passing through first or supply port 42 will continue flowing to valve 14. Should the pilot pressure in third chamber 40 be reduced to zero or for any other reason the supply fluid provide a force that overrides the force exerted along plunger 54 by the pilot pressure, then second shoulder 80 on poppet member 74 seats on shoulder 34 on body 30 which blocks fluid flow from first chamber 36 to second chamber 38 while permitting the pressure from the fluid incoming from valve port 46 to force plunger 54 away from poppet member to thereby allow the fluid to flow through passageway 58 and out exhaust port 48.

Further, if desired, a spring 91 may be disposed between the valve body 30 and piston 70 to urge plunger 54 away from poppet member 74 which insures displacement of plunger 54 from poppet 74 after poppet 74 establishes sealing contact with shoulder 34 on body 30.

Further, apparatus may be provided in each valve 10 to indicate when the valve is permitting fluid communication between the first chamber 36 and second chamber 38 (the normal operating mode) or when the valve is permitting fluid communication between second port 46 and third port 48 (the block and bleed mode). This apparatus includes a faceplate 94 covering an aperture 96 provided in a side wall of housing 30 to permit visual observation into third chamber 40. A window 98 is supported by faceplate 94 so as to permit visual observation into third chamber 40 while preventing foreign materials from passing into the chamber. A ring 100 is connected to the lower edge of piston 70 and may be provided with different colored bands or lettered bands for observance through window 98 to indicate on which mode the valve is operating.

Further, as shown in FIGS. 1, 3, 4 and 6, apparatus 102 may be provided to manually override the block and bleed mode of operation and place the valve in its normal operating mode. This apparatus preferably includes a body 103, which replaces a cover 56 attached to the top of valve body 30 and defines a sub-chamber 110 of third chamber 40, and a handle 104 connected to a shaft 106 that extends through faceplate 94 and a side wall of the valve into a piston 108 moveably disposed within sub-chamber 110. A cam pin or shoulder 112 extends outwardly from piston 108 for engaging a cap-like extension, shoulder or head on plunger 54. Thus, by pushing handle 104 inwardly of body 30 and rotating handle 104, cam pin 112 is positioned above plunger 54 and then rotating the handle will cause plunger 54 to be moved downwardly against poppet member 74. Fluid communication is thus prevented between second port 46 and third port 48, while further rotation of handle 104 will unseat poppet member 74 from body 30 and permit fluid communication between first port 42 and second port 46. A flat surface 116 may be provided on cam shoulder 112 for indicating to the person using handle 104 that valve 10 is now in the override position. Further, this flat surface will act as a friction lock mechanism to prevent free movement of apparatus 102 when pilot pressure in sub chamber 110 is zero. When valve 10 is in the override position, pilot pressure flowing through port 50 simultaneously acts against piston 70 and piston 108 to cause piston 70 to displace plunger 54 downward relieving frictional contact between plunger 54 and cam pin 112 while producing axial pressure force on piston 108 resulting in the outward movement of override apparatus 102 out of the motion pathway of plunger 54 to permit the valve to continue in its normal operating mode. This action being an automatic reset of the manual override apparatus.

As best shown in FIGS. 3, 4, 6 and 7, lock-out apparatus 118 may be provided in valve 10 to prevent valve 10 from becoming reactivated without manual manipulation. This apparatus includes a tubular member 120 moveably disposed within sub chamber 110 axially of shaft 106 and piston 108. Tubular member 120 has a passageway 121 of stepped diameter sized passages and a lower slotted sidewall 122 to provide a passageway and access to receive cap-like shoulder or head 114 of plunger 54 and acts as a shoulder 124 for engaging cap-like shoulder 114. If desired, the inner surface of the side wall of tubular member 120 may be with a flat surface for engaging with the undercut shoulder of cap-like member 114. As shown, a coil spring 126 is provided between a shoulder 128 on retainer 152 and a shoulder 130 on tubular member 120 for urging member 120 into engagement with cap-like shoulder 114. Thus, when plunger 54 is moved upwardly, as from the position shown in FIG. 3 to the position shown in FIG. 4, tubular body 120 is moved into engagement with the downwardly facing surface of cap-like shoulder 114 to thereby prevent accidental resetting of valve 10 into its operational mode. Thus, by moving manual override apparatus 102, leftwardly as viewed in FIGS. 3 and 4, lockout apparatus 118 is disengaged when overriding the valve, as previously explained, and thereby permitting resetting of the valve.

Referring to FIG. 3 of the drawing, it should be readily apparent that when pressure is restored through pilot port 50 fluid will flow through passageway 121 and bore 134 thereby causing pressure to be exerted in chamber 40 for moving piston 70 downwardly. As piston 70 moves downwardly it will be disengaged from the flat surface 116 on cam shoulder 112 which will result in movement of piston 108 and member 118 as a result of force exerted by spring 126, from the position shown in FIG. 3 of the drawing, to a position wherein the head 114 on plunger 54 engages the end 124 of slot 122 which prevents movement of member 118 to the lock-out position shown in FIG. 4. Thus, while pressure is exerted on the upper surface of piston 70, the apparatus will be maintained in a normal operating position wherein the end 124 of slot 122 engages head 114 on plunger 70, while cam shoulder 112 is moved out of engagement with head 114. In this normal operating position, the head 114 is free to move vertically, without obstruction from cam shoulder 112 or lock-out device 118 in response to forces exerted on plunger 70 by fluid pressure in the valve body as hereinbefore described.

An optional face contact seal 132, secured to the upper surface of piston 70, closes pressure access through bore 134 of body 103 to the top of piston 70 when piston 70 is in its uppermost position. Closure of bore 134 denies admittance of pilot pressure to the full area of piston 70 in event of pilot pressure admission through port 50 to intermediate chamber 110 prior to manual disengagement of lock out apparatus 118 and manual resetting of valve 10. Restricting the magnitude of the piston 70 area exposed to pilot pressure will diminish the pressure forces which are retained by lock out apparatus 118. The face contact seal 132 is to be utilized only in conjunction with the use of the manual override apparatus 102, but the seal is not necessary for utilization of lock out mechanism 118.

The invention having been described, what is claimed is:

1. A three way relay valve, comprising: a body defining first, second and third chambers and having a supply port in fluid communication with the first chamber, valve and exhaust ports in fluid communication with the second chamber, and a pilot port in fluid communication with the third chamber to provide a pilot pressure therein, said third chamber including a sub-chamber; a plunger moveably disposed within said body havind a length sufficient to extend from the third chamber into the second chamber with a passageway provided therein to place the valve port in fluid communication with the exhaust port; means moveably disposed within the third chamber for exerting a force along the plunger in response to the pilot pressure; a poppet member moveably disposed within the first chamber adapted to engage with said body to block fluid communication between the first and second chambers and adapted to engage with said plunger to prevent fluid flow through the passageway in the plunger which blocks fluid communication between the valve and exhaust ports; means disposed within said body for urging said poppet member into engagement with the plunger such that said poppet member engages the plunger to block fluid communication between the valve and exhaust ports when the force exerted along the plunger in response to the pilot pressure prevents said poppet member from engaging with said body and such that said poppet member engages said body to block fluid communication between the supply and valve ports when fluid pressure in the first chamber acting on said poppet member overrides the force exerted along the plunger in response to the pilot pressure; a piston member having a piston body moveably disposed in said sub-chamber of the third chamber; a cam pin extending from the body for engaging a shoulder on said plunger; a shaft extending outwardly of said valve body; a flat surface on said cam pin to aid in locking the cam pin in engagement with said piston member until sufficient pressure develops in the sub-chamber to overcome friction between said plunger and cam pin and thereby move the piston member out of engagement with said plunger; and a handle connected to the shaft such that the cam pin engages the shoulder on said plunger when the handle is turned to move the plunger and disengage said poppet member from said body.

2. A three way relay valve, comprising: a body defining first, second and third chambers and having a supply port in fluid communication with the first chamber, valve and exhaust ports in fluid communication with the second chamber, and a pilot port in fluid communication with the third chamber to provide a pilot pressure therein; a plunger moveably disposed within said body having a length sufficient to extend from the third chamber into the second chamber with a passageway provided therein to space the valve port in fluid communication with the exhaust port; means moveably disposed within the third chamber for exerting a force along the plunger in response to the pilot pressure; a poppet member moveably disposed within the first chamber adapted to engage with said body to block fluid communication between the first and second chambers and adapted to engage with said plunger to prevent fluid flow through the passageway in the plunger which blocks fluid communication between the valve and exhaust ports; means disposed within said body for urging said poppet member into engagement with the plunger such that said poppet member engages the plunger to block fluid communication between the valve and exhaust ports when the force exerted along the plunger in response to the pilot pressure prevents said poppet member from engaging with said body and such that said poppet member engages said body to block fluid communication between the supply and valve ports when fluid pressure in the first chamber acting on said poppet member overrides the force exerted along the plunger in response to the pilot pressure; a tubular body moveably disposed in a sub-chamber of the third chamber, a slot provided longitudinally of the tubular body for receiving a generally cap-like extension provided on said plunger, and means for urging said tubular body into engagement with said plunger such that when said plunger moves inwardly of the sub-chamber a shoulder formed by a side wall of the tubular body engages the cap-like extension and prevents the plunger from moving into engagement with said poppet member after said poppet member engages said body thereby blocking fluid communication between the first and second chambers.

3. A valve as set forth in claim 2, further comprising: means to indicate when said plunger engages said poppet member having an indicating member connected to the force exerting means and a faceplate covering an aperture extending thru a wall in said body and disposed to permit observation of the indicating member when said plunger engages said poppet member.

4. A valve as set forth in claim 2, wherein said force exerting means includes a piston connected to said plunger.

5. A three way relay valve; comprising: a body having a bore and first, second and third ports, the ports being in fluid communication with the bore; a plunger moveably disposed in the bore having a passageway through which fluid may flow to place the second port in fluid communication with the third port; a poppet member moveably disposed in said body to selectively block fluid communication between the first and second ports by preventing fluid flow through the bore into said body and between the second and third ports by preventing fluid flow through the passageway in said plunger; means disposed in said body for urging said poppet member into engagement with said body to prevent fluid flow through the bore from the first to the second ports; said body including a chamber and a fourth port disposed in fluid communication with the chamber; a piston connected to said plunger moveably disposed within the chamber such that a fluid of chosen pressure may be applied to said piston which prevents fluid communication between the second and third ports until fluid pressure in the first port is sufficient to overcome the chosen pressure and move said poppet member intgo engagement with said body; a piston member moveably disposed in a sub-chamber in said body, said piston member having a body; a cam pin connected to the piston body for engaging a shoulder on said plunger and a shaft connected to the piston member body and extending outwardly of the valve body; a flat surface to aid in locking said manual override apparatus in engagement with said plunger until sufficient pressure develops in the sub-chamber to overcome friction between said plunger and cam pin which moves the piston out of engagement with said plunger; and a handle connected to said piston memer such that upon turning the handle, the plunger moves into engagement with said poppet member and thereby permit fluid communication between the first and second ports while blocking fluid communication between the second and third ports.

6. A three way relay valve, comprising: a body having a bore and first, second and third ports, the ports being in fluid communication with the bore; a plunger moveably disposed in the bore having a passageway through which fluid may flow to place the second port in fluid communication with the third port; a poppet member moveably disposed in said body to selectively block fluid communication between the first and second ports by preventing fluid flow through the bore into said body and between the second and third ports by preventing fluid flow through the passageway in said plunger; means disposed in said body for urging said poppet member into engagement with said body to prevent fluid flow through the bore from the first to the second ports; a tubular body moveably disposed in a chamber in said valve body, a slot provided longitudinally of the tubular body for receiving in generally flat headed extension of said plunger; and means for urging said tubular body into engagement with said plunger such that when the extension of said plunger moves inwardly of said tubular body a sidewall engages the extension and prevents the plunger from moving outwardly of the chamber into the bore of said body; and means for urging said plunger into engagement with said poppet member to prevent fluid flow through the passageway in said plunger such that fluid communication between the first and second ports is blocked when said poppet member engages said body and fluid communication between the second and third ports is blocked when said poppet member engages said plunger.

7. In a valve, a valve body having a pilot chamber and having a pilot pressure port communicating therewith, said pilot chamber being divided into a main chamber and a sub-chamber, a piston actuated plunger in the valve body arranged to be actuated by pressure in said pilot chamber, and means urging said piston toward a position wherein said plunger actuates a valve in the valve body in response to a change in fluid pressure in the pilot chamber, the improvement comprising: a reset piston member moveably disposed in the sub-chamber, said piston member having a piston body; a cam pin extending from the body for engaging a shoulder on said plunger; a shaft extending outwardly of said valve body; and a handle connected to the shaft such that the cam pin engages the shoulder on said plunger when the handle is urged inwardly and rotated to move the plunger, said piston member and said cam pin being movable by pressure in said sub-chamber to disengage said cam pin from said shoulder on said plunger.

8. In a valve, a valve body having a pilot chamber and a pilot pressure port communicating therewith, said pilot chamber being divided into a chamber and a sub-chamber, a piston actuated plunger in the valve body arranged to be actuated by pressure in said pilot chamber, and means urging said piston toward a position wherein said plunger moves a valve element in the valve body in response to a change in fluid pressure in the pilot chamber, the improvement comprising: a tubular body moveably disposed in said sub-chamber, said tubular body having a slot for receiving a generally flat headed extension provided on said plunger; and means for urging said tubular body into engagement with said plunger such that when the extension of said plunger moves inwardly of said tubular body a sidewall engages the extension and prevents the plunger from moving the valve element.

9. A valve as set forth in claim 8, further comprising: manual override apparatus for moving said plunger to actuate the valve.

10. A valve as set forth in claim 9, wherein said manual override apparatus includes as piston member moveably disposed in said sub-chamber having a piston body, a cam pin extending from the body for engaging a shoulder on said plunger; a shaft extending outwardly of said valve body; and a handle connected to the shaft such that the cam pin engages the shoulder on said plunger when the handle is turned to move the plunger and actuate the valve.

* * * * *